United States Patent
Campbell et al.

(10) Patent No.: US 6,598,905 B2
(45) Date of Patent: Jul. 29, 2003

(54) HOSE COUPLING

(75) Inventors: David A. Campbell, El Paso, TX (US); Fred G. Schroeder, Grosse Ile, MI (US); David Urueta, Juarez Chih (MX)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/753,135

(22) Filed: Dec. 29, 2000

(65) Prior Publication Data

US 2002/0084650 A1 Jul. 4, 2002

(51) Int. Cl.[7] .............................................. F16L 33/207
(52) U.S. Cl. ........................ 285/256; 285/239; 285/347; 285/351; 29/890.144; 29/516
(58) Field of Search ................................. 285/256, 238, 285/239, 257, 259, 347, 351; 29/890.144, 516

(56) References Cited

U.S. PATENT DOCUMENTS

| 2,278,239 | A | * | 3/1942 | Butler ..................... 285/256 X |
| 3,165,338 | A | * | 1/1965 | Moss ......................... 285/256 |
| 3,578,360 | A | * | 5/1971 | Eliot ....................... 285/256 X |
| 5,044,671 | A | * | 9/1991 | Chisnell et al. ......... 285/256 X |
| 5,417,461 | A |   | 5/1995 | Dougherty et al. |
| 5,934,711 | A | * | 8/1999 | Gady ..................... 285/351 X |
| 5,961,157 | A |   | 10/1999 | Baron et al. |
| 6,095,571 | A | * | 8/2000 | MacDuff .................... 285/256 |
| 6,099,045 | A | * | 8/2000 | Pirona ........................ 285/256 |

FOREIGN PATENT DOCUMENTS

| EP | 555650 | * | 1/1993 | ............. 285/256 X |
| FR | 2675880 | * | 4/1991 | ............. 285/256 X |
| JP | 2256992 | * | 10/1990 | ............. 285/256 X |

* cited by examiner

Primary Examiner—Lynne H. Browne
Assistant Examiner—David E. Bochna
(74) Attorney, Agent, or Firm—Brinks Hofer Gilson & Lione

(57) ABSTRACT

A coupling and methods for assembling and using the coupling for connecting a hose with a tube, pipe or other hose in an automotive refrigerant system. The coupling comprises a connector member connected to a tube, pipe or hose, the connector member having at least one circumferential groove into which at least one sealing member is disposed. A hose is fitted over the connector member and covers the sealing member. A collar is disposed over the hose and the at least one sealing member and is deformed such that the hose is brought into engagement with the at least one sealing member and the at least one sealing member and hose occupy substantially 100% of the volume of the at least one circumferential groove.

25 Claims, 2 Drawing Sheets

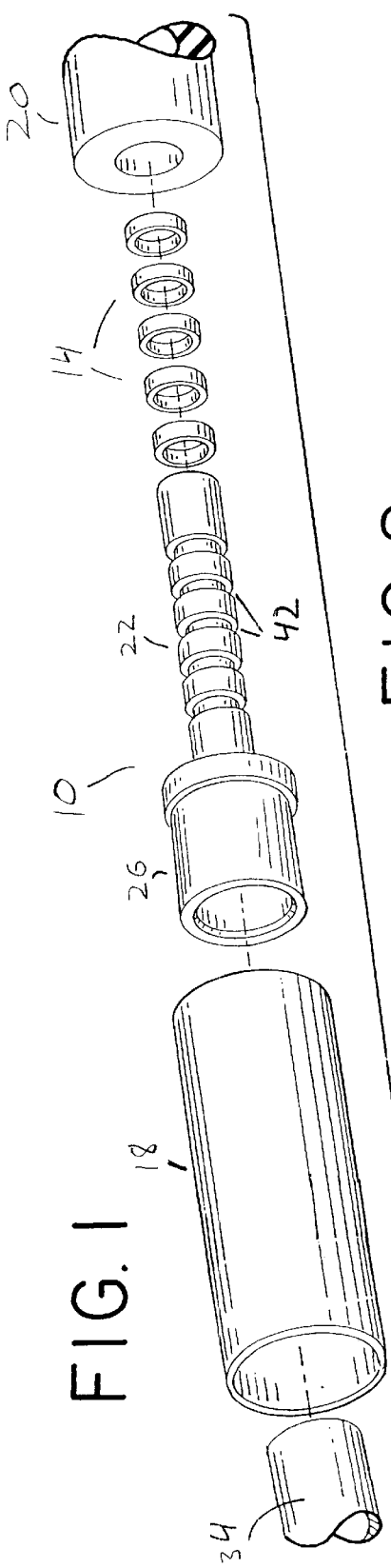
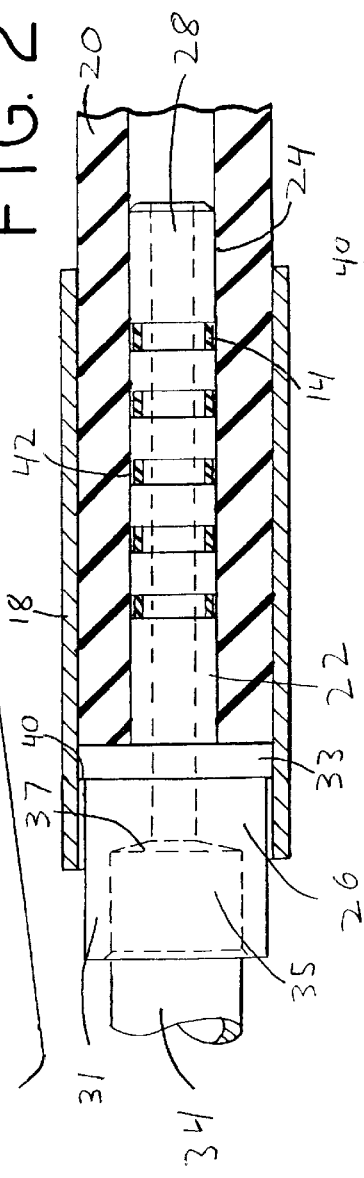
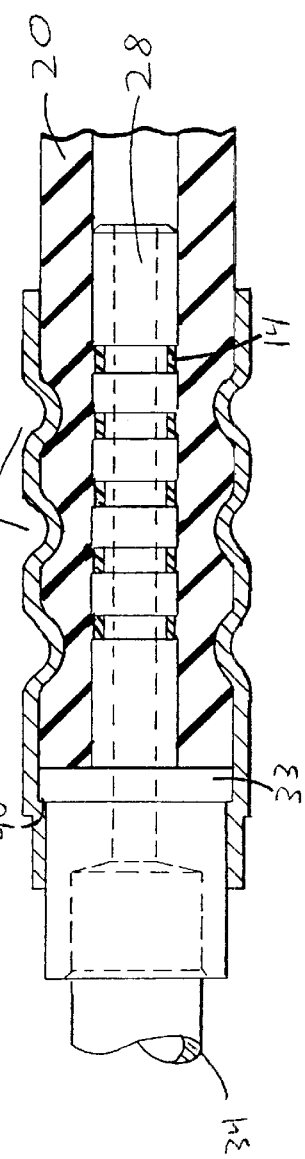

HOSE COUPLING

BACKGROUND OF THE INVENTION

The present invention generally relates to a coupling for connecting a deformable hose with a pipe, tube or hose. It also relates to a method for making such a coupling. In particular, the invention may be used in automotive carbon dioxide air conditioning refrigerant systems for connecting a metal tube with a polymer hose.

Due to automotive design considerations, it has been common for an automobile's air conditioning system to contain couplings which connect a metal pipe to a polymer deformable hose. Recently developed automotive refrigerant systems utilizing carbon dioxide as a refrigerant require new coupling design considerations to handle the higher system pressures and relatively small molecular size of the carbon dioxide molecule. The higher system pressures expose traditional coupling designs to sudden destructive decompression when system pressure is suddenly lost, causing damage to the sealing members. Additionally, the relatively small molecular size of carbon dioxide results in increased permeability of the gas using traditional coupling designs.

BRIEF SUMMARY OF THE INVENTION

Briefly stated, in accordance with one aspect of the present invention, a coupling is provided that includes a connector member comprising a stem section and a receiving section connected to the stem section. The connector member also defines an internal passage. The stem section comprises an exterior surface and at least one circumferential groove formed therein, defining a volume. The coupling also defines at least one seal member disposed within the at least one circumferential groove. The seal member has an exterior surface and has a volume that is less than the volume of the circumferential groove. The coupling also comprises a deformable hose fitted over the stem section and covering the at least one circumferential groove. The coupling also comprises a collar disposed over the deformable hose. The collar comprises at least one radially extending protrusion engaging the hose and bringing the hose into engagement with the exterior surface of the seal member wherein the seal member and hose fill substantially 100% of the volume of the circumferential groove.

In accordance with another aspect of the invention, a method of assembling a coupling is provided. The steps of assembly first provide for a connector member having an internal passageway and at least one circumferential groove. At least one seal member is then disposed into at least one circumferential groove wherein the seal member has a volume less than the circumferential groove. A collar is then disposed over the connector member. The connector member is then inserted into an end of a deformable hose so that the deformable hose covers at least one circumferential groove containing a seal member. Radial protrusions are then formed into the collar. The protrusions force a portion of the deformable hose into at least one circumferential groove containing a seal member and engage the seal member such that the deformable hose and seal member occupy substantially 100% of the volume of at least one circumferential groove.

In accordance with yet another aspect of the invention, a method of using the coupling is provided. A coupling is first provided wherein the coupling comprises a connector member, a deformable hose fitted over the connector member, and a collar disposed over the connector member. The collar comprises a radial protrusion which engages the deformable hose which, in turn, engages a seal member disposed within at least one circumferential groove in the connector member. The deformable hose and seal member fill substantially 100% of the volume of the circumferential groove. In the second step of using the coupling, the hose and coupling are pressurized.

The present invention provides significant advantages over existing coupling designs. The invention, as described further below, addresses sudden destructive decompression by mechanically restricting expansion of the seal members in case of system depressurization. This mechanical restriction prevents damage to the seal members, allowing for the system to be pressurized again without the need for replacing the seal members. A further advantage of the present invention is that it presents an efficient simplified locking means to provide easier and more inexpensive manufacture and assembly. The invention also provides better sealing properties to limit permeation of the relatively small carbon dioxide molecule.

Advantages of the present invention will become readily apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are to be regarded as illustrative in nature and not as restrictive.

BRIEF DESCRIPTION OF SEVERAL VIEWS OF THE DRAWINGS

FIG. 1 is a perspective exploded view of the coupling of the present invention showing the various parts of the invention prior to deforming the collar;

FIG. 2 is a cross-sectional view of the coupling of the present invention prior to deforming the collar;

FIG. 3 is a cross-sectional view of the coupling of the present invention after the collar has been deformed;

DETAILED DESCRIPTION OF THE PRESENTLY PREFERRED EMBODIMENTS OF THE INVENTION

Figure 4:
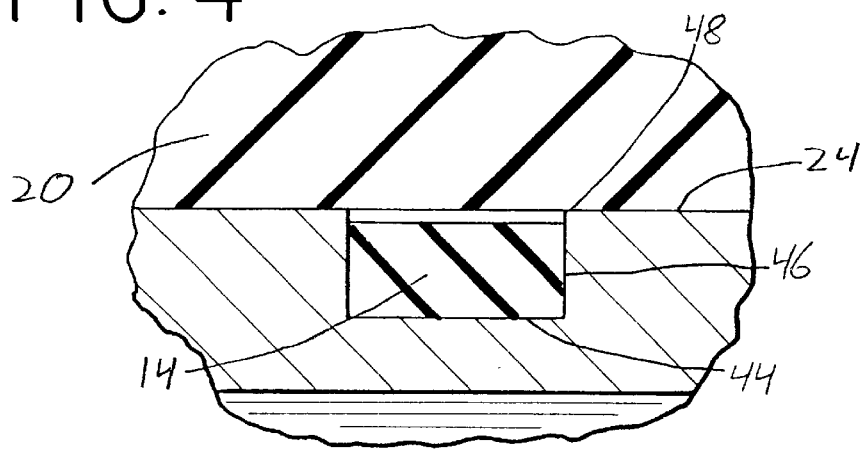
FIG. 4 is a cross-sectional view of the coupling of the present invention showing a detail of an embodiment of a seal member disposed within the circumferential groove prior to deforming the collar.

Referring to FIG. 1, one preferred embodiment of the coupling comprises a connector member 10, sealing members 14, and a collar 18. In a preferred embodiment, the coupling comprises a deformable hose 20 which is a part of the refrigerant system.

The connector member 10 comprises a stem section 22 and a receiving section 26 connected with the stem section 22. In the preferred embodiment described in detail herein, the connector member 10 is of a generally circular cross-section and defines an internal passageway 28 running from end to end. The connector member is preferably made of stainless steel, carbon steel, aluminum, or other similar materials.

The receiving section 26 of the connector member 10 is generally cylindrically shaped and defines a pipe section 31 and a ring section 33 having a larger diameter than the pipe section 31. A circumferential transition section 40 which is substantially perpendicular to the pipe section 31 is defined at the junction between the pipe section 31 and the ring section 33. The pipe section 31 defines a substantially cylindrical internal duct 35. The internal duct 35 is suitably sized to accommodate a mating pipe 34 of the refrigerant system. The pipe 34 of the refrigerant system is inserted into the internal duct 35 so that it abuts with a wall 37 at the terminal end of the internal duct 35. The pipe 34 is then fastened to the connector member 10 through a brazing or welding operation. The pipe 34 is oriented within the internal duct to allow fluid to flow through the pipe 34 and the internal passageway 28 of the connector member 10.

The stem section 22 is connected with the receiving section 26. The stem section 22 is generally of a cylindrical shape and defines an outer diameter 24 suitably sized so the stem section 22 may be inserted into the deformable hose 20 of the refrigerant system. The stem section 22 defines at least one circumferential groove 42 adapted to receive at least one sealing member 14. In the preferred embodiment, the coupling contains five (5) circumferential grooves 42 and five (5) sealing members 14 disposed therein. While more or less than five (5) grooves 42 and five (5) sealing members 14 may be used, five (5) provides an efficient and cost effective connection that remains operable throughout the life of the refrigerant system.

Figure 5:
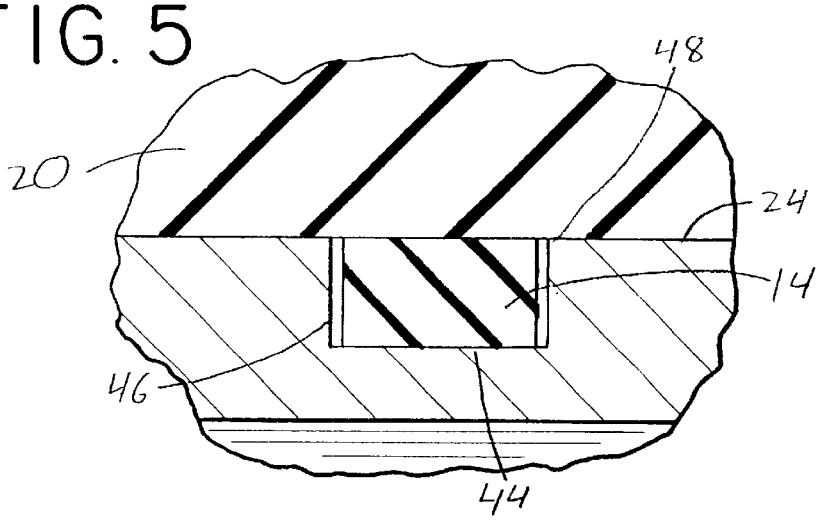
FIG. 5 is a cross-sectional view of the coupling of the present invention showing a detail of an another embodiment of a seal member disposed within the circumferential groove prior to deforming the collar.

As shown in FIGS. 4 and 5, The circumferential grooves 42 define a groove floor 44 and groove walls 46. In the preferred embodiment, the circumferential grooves 42 are of a rectangular cross-section, however, the intersection between the groove floor 44 and groove walls 46 may be rounded. The cross-sectional intersection 48 between the groove walls 46 and the outside diameter 24 of stem section 22 form a substantially right angle.

As mentioned above, a sealing member 14 is disposed within each circumferential groove 42. In the preferred embodiment, the sealing member 14 is a prefabricated o-ring made of fluorocarbon elastomer which is installed within the circumferential groove 42. The sealing member may also be directly molded into each circumferential groove 42. An important feature of the invention is that the sealing member 14 and circumferential groove 42 are suitably sized so that the volume of the sealing member 14 is less than the volume of the circumferential groove 42. In the preferred embodiment, the volume of the sealing member 14 is 90% of the volume of the circumferential groove 42, however, the volume of the sealing member 14 can range between 70% and 95% of the volume of the circumferential groove 42. As shown in FIG. 4, prior to deforming the collar, the sealing member 14 occupies 90% of the volume of the circumferential groove 42 with 10% of the volume of the circumferential groove 42 being space above the sealing member 14. Similarly in FIG. 5, the 10% volume of space can also be located between the sealing member 14 and the groove walls 46. The sealing member 14 may be of rectangular or circular cross-section. In the preferred embodiment, the sealing member 14 is suitably sized so that no portion protrudes above the circumferential groove 42 beyond the outer diameter 24 of the stem section 22. This facilitates ease of assembly of the coupling so that the deformable hose 20 does not become caught on a sealing member 14 when the stem section 22 is inserted into the deformable hose 20.

As mentioned above, the stem section 22 is inserted into the deformable hose 20. In the preferred embodiment, the deformable hose 20 is a composite with a core tube of nylon or similar plastic material which acts as the barrier to refrigerant permeation. The core tube is covered by braiding for pressure resistance and outer cover over the braiding protects the hose 20 from the environment.

The coupling of the present invention also defines a collar 18. In the preferred embodiment, the collar 18 is substantially can shaped wherein the collar 18 defines two open ends. The collar 18 is suitably sized to be inserted over the ring section 33 of the connector member 10 and is of a length to cover the pipe section 31 and all circumferential grooves 42 of the stem section 22. The collar 18 should be capable of being permanently deformed and can be made of materials such as, steel, stainless steel, or aluminum.

In operation, seal members 14 are disposed within the circumferential grooves 42 of the stem section 22. A pipe 34 of the refrigerant system is connected with the pipe section 31 of the connector member 10. The collar 18 is then inserted over the connector member and placed toward the pipe 34 of the refrigerant system such that the stem section 22 remains exposed. As shown in FIG. 2., the stem section 22 is then inserted into the deformable hose 20 of the refrigerant system such that the deformable hose 20 covers the circumferential grooves 42 of the stem section 22. The collar 18 is then placed over the connector member 10 and hose 20 so that the collar 18 covers a portion of the pipe section 31 and covers all of the circumferential grooves 42. The collar 18 is then permanently deformed in several areas. In the preferred embodiment as shown in FIGS. 2 and 3, the collar is mechanically deformed by a crimping operation. The permanently deformed collar 18 mates with the pipe section 31 and transition section 40, forming a mechanical lock. This lock restricts the collar 18 from moving axially in the direction of the deformable hose 20.

Figure 6:
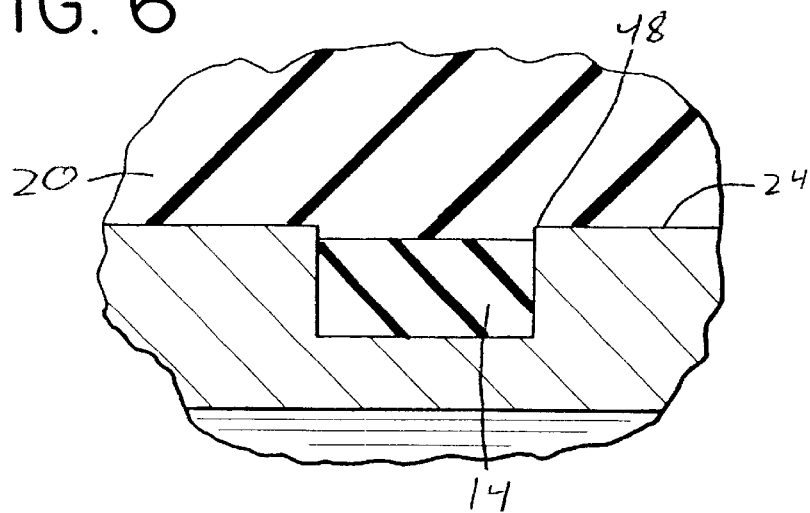
FIG. 6 is a cross-sectional view of the coupling of the present invention showing a detail of an embodiment of a seal member disposed within the circumferential groove after the collar has been deformed.

At least one radially extending protrusion 50 is also formed by the crimping operation into the collar 18 over the deformable hose 20. In the preferred embodiment, three (3) equally spaced radially extending protrusions 50 are permanently formed in the collar 18, however, more or less may be used depending upon the number of circumferential grooves 42 and seal members 14 utilized. The protrusions 50 should be formed with sufficient pressure to force the deformable hose 20 into the circumferential grooves 42 so that the deformable hose 20 contacts with the sealing members 14. As shown in FIG. 6, the deformable hose 20 fills the space within the circumferential groove 42 left by the sealing member 14 so that substantially 100% of the volume of the circumferential groove 42 is occupied by the deformable hose 20 and seal member 14. As shown in FIG. 5, where space is between the sealing member 14 and groove walls 46 prior to deforming the collar 18, the deformable hose 20 applies pressure to the surface of the sealing member 14 proximate to the deformable hose 20, forcing the sealing member 14 into the space. Similarly as shown in FIG. 4, where space is between the sealing member 14 and the deformable hose 20 prior to deforming the collar 18, the deformable hose 20 fills the space and exerts pressure on the surface of the sealing member 14. In either case, after the collar 18 has been deformed, as shown in FIG. 6, the deformable hose 20 is within the circumferential groove 42, and the sealing member 14 and deformable hose 20, occupy substantially 100% of the volume of the circumferential groove 42. In the preferred embodiment, the deformable hose 20 occupies 10% of the volume of the circumferential groove 42, however, the volume occupied by the deformable hose 20 may range from 5% to 30%.

Pressure exerted on the sealing member 14 by the deformable hose 20 prevents damage to the sealing member 14 during sudden decompression of the system fluid. Because substantially 100% of the volume of the circumferential groove 42 is occupied by the sealing member 14 and deformable hose 20, the sealing member does not expand into spaces within the coupling. The sealing member 14 is mechanically arrested by the deformable hose 20 and is not subject to harmful expansion due to sudden decompression.

Additionally, the circumferential grooves 42 act as a mechanical lock to restrict axial motion of the deformable hose 20. When the deformable hose 20 is disposed within the circumferential grooves 42 after the collar 18 has been deformed, the hose 20 is forced against the groove walls 46 and intersection 48. The hose 20 is then mechanically restricted from moving in an axial direction. In the preferred embodiment, no additional grooves or locking mechanism is required to hold the hose 20 within the coupling.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The following is claimed:

1. A coupling comprising:
    a connector member comprising a stem section and a receiving section connected to said stem section, said connector member having an internal passage formed therein, wherein said stem section comprises an exterior surface and at least one circumferential groove formed therein defining a volume;
    at least one seal member disposed within said at least one circumferential groove, the at least one seal member comprising an exterior surface and having a volume that is less than the volume of said circumferential groove;
    a deformable hose fitted over the stem section and covering said at least one circumferential groove; and
    a collar disposed over said deformable hose, wherein said collar comprises at least one radially extending protrusion engaging said hose and bringing said hose into engagement with said exterior surface of said seal member wherein the seal member and the hose fill substantially 100% of the volume of the circumferential groove.

2. The coupling of claim 1 wherein the collar is connected with the connector member.

3. The coupling of claim 1 wherein said at least one seal member is an o-ring.

4. The coupling of claim 3 wherein the o-ring has a rectangular cross-section.

5. The coupling of claim 1 wherein the stem section comprises five longitudinally spaced circumferential grooves, wherein each of said circumferential grooves contains at least one seal member.

6. The coupling of claim 5 wherein three radially extending protrusions are formed on the collar.

7. The coupling of claim 1 wherein the hose occupies between 5% and 30% of the volume of the circumferential groove.

8. The coupling of claim 1 wherein said exterior surface of said seal member does not extend beyond the exterior surface of said stem section.

9. A method of assembling a coupling comprising the steps of:
    providing a connector member comprising a stem section and a receiving section connected to said stem section, said connector member having an internal passage formed therein, wherein said stem section comprises an exterior surface and at least one circumferential groove formed therein defining a volume;
    disposing at least one seal member into said at least one circumferential groove, wherein the at least one seal member comprises an exterior surface and has a volume that is less than the volume of said at least one circumferential groove;
    disposing a collar over the connector member;
    inserting said stem section into an end of a deformable hose and covering said at least one circumferential groove containing said at least one seal member with said hose; and
    forming at least one radially extending protrusion into the collar, and thereby forcing a portion of the deformable hose into the circumferential groove with said at least one protrusion and engaging the exterior surface of the sealing member with said hose, wherein the sealing member and said deformable hose occupy substantially 100% of the volume of the circumferential groove.

10. The method of claim 9 further comprising connecting the collar with the connector member after inserting the stem section into the end of the deformable hose.

11. The method of claim 9 wherein the stem section comprises five longitudinally spaced circumferential grooves, wherein each of said circumferential grooves contains at least one seal member.

12. The method of claim 11 wherein said forming said at least one radially extending protrusion into the collar comprises forming three radially extending protrusions.

13. The method of claim 9 wherein the at least one seal member is an o-ring.

14. The method of claim 13 wherein said at least one o-ring has a rectangular cross-section.

15. The method of claim 9 wherein the hose occupies between 5% and 30% of the volume of the circumferential groove.

16. The method of claim 9 wherein said exterior surface of said seal member does not extend beyond the exterior surface of said stem section.

17. A method of using a coupling comprising the steps of:
    providing a connector member comprising a stem section and a receiving section connected to said stem section, said connector member having an internal passage formed therein, wherein said stem section comprises an exterior surface and at least one circumferential groove formed therein defining a volume; at least one seal member disposed within said at least one circumferential groove, the at least one seal member comprising an exterior surface and having a volume that is less than the volume of said circumferential groove; a deformable hose fitted over the stem section and covering said at least one circumferential groove; and a collar disposed over said deformable hose, wherein said collar comprising at least one radially extending protrusion engaging said hose and bringing said hose into engagement with said exterior surface of said seal member wherein the seal member and the hose fill substantially 100% of the volume of the circumferential groove; and
    pressurizing said hose and connector member.

18. The method of claim 17 further comprising connecting a tube to said receiving section and pressurizing said tube.

19. The method of claim 17 wherein the stem section comprises five longitudinally spaced circumferential grooves, wherein each of said circumferential grooves contains at least one seal member.

20. The method of claim 19 wherein said collar comprises three radially extending protrusions.

21. The method of claim 17 wherein said at least one seal member is an o-ring.

22. The method of claim 21 wherein said o-ring has a rectangular cross-section.

23. The method of claim 17 wherein said hose occupies between 5% and 30% of the volume of the circumferential groove.

24. The method of claim 17 wherein said exterior surface of said seal member does not extend beyond the exterior surface of said stem section.

25. The method of claim 17 further comprising connecting the collar to the connector member.

* * * * *